United States Patent
Seidl et al.

(10) Patent No.: US 8,808,127 B2
(45) Date of Patent: Aug. 19, 2014

(54) DIFFERENTIAL ASSEMBLY AND DRIVING ASSEMBLY WITH A DIFFERENTIAL ASSEMBLY

(75) Inventors: Holger Seidl, Siegburg (DE); Jiri Marks, Hennef (DE)

(73) Assignee: GKN Driveline International GmbH, Lohmar (DE)

( * ) Notice: Subject to any disclaimer, the term of this patent is extended or adjusted under 35 U.S.C. 154(b) by 229 days.

(21) Appl. No.: 13/512,782

(22) PCT Filed: Nov. 29, 2010

(86) PCT No.: PCT/EP2010/068415
§ 371 (c)(1),
(2), (4) Date: Jun. 18, 2012

(87) PCT Pub. No.: WO2011/064364
PCT Pub. Date: Jun. 3, 2011

(65) Prior Publication Data
US 2012/0252621 A1    Oct. 4, 2012

(30) Foreign Application Priority Data
Nov. 30, 2009    (DE) .................. 10 2009 056 088

(51) Int. Cl.
*F16H 48/30*    (2012.01)
*B60K 6/52*    (2007.10)
*B60W 10/02*    (2006.01)
*B60W 10/08*    (2006.01)
*F16D 11/00*    (2006.01)
*H01F 7/18*    (2006.01)
*F16H 48/08*    (2006.01)
*B60K 1/00*    (2006.01)

(52) U.S. Cl.
CPC .............. *B60K 6/52* (2013.01); *H01F 7/1844* (2013.01); *Y02T 10/6265* (2013.01); *F16H 48/08* (2013.01); *B60W 10/02* (2013.01); *B60W 10/08* (2013.01); *F16D 2300/18* (2013.01); *B60W 2510/0225* (2013.01); *B60K 2001/001* (2013.01); *F16D 11/00* (2013.01)
USPC .......................................... 475/150; 475/231

(58) Field of Classification Search
USPC .................... 475/150, 230, 231, 248
See application file for complete search history.

(56) References Cited

U.S. PATENT DOCUMENTS

| 6,015,361 | A  | * | 1/2000  | Yamazaki et al. ............ 475/230 |
| 6,027,422 | A  |   | 2/2000  | Yamazaki |
| 6,832,972 | B2 |   | 12/2004 | Ishikawa |

(Continued)

FOREIGN PATENT DOCUMENTS

JP    11210864    8/1999

OTHER PUBLICATIONS

PCT International Search Report dated Jan. 24, 2011 for PCT/EP2010/068415.

*Primary Examiner* — Justin Holmes
(74) *Attorney, Agent, or Firm* — Bejin VanOphem and Bieneman, PLC

(57) ABSTRACT

A differential assembly is disclosed, and more particularly a differential assembly for a motor vehicle driving axle drivable by an electric motor. The differential assembly comprises a driving gear; a differential drive with an input part and two output parts, wherein the output parts are drivingly connected to the input part and, relative to one another, have a differential effect; a coupling which is arranged effectively between the driving gear and the differential drive, wherein, in a closed condition of the coupling, torque is transmitted from the driving gear to the differential drive and, in an open condition of the coupling, a transmission of torque is interrupted; a controllable actuator for actuating the coupling and a sensor for determining at least three switched positions of the coupling. Furthermore, a driving assembly with such a differential assembly is also disclosed.

17 Claims, 6 Drawing Sheets

(56) References Cited

U.S. PATENT DOCUMENTS

| | | |
|---|---|---|
| 6,945,895 B2 | 9/2005 | Fusegi et al. |
| 7,074,150 B2 | 7/2006 | Fusegi et al. |
| 7,156,771 B2 | 1/2007 | Teraoka |
| 7,247,117 B2 * | 7/2007 | Forster .......................... 475/221 |
| 2005/0279607 A1 | 12/2005 | Fusegi |
| 2008/0045371 A1 * | 2/2008 | Donofrio et al. .............. 475/230 |
| 2008/0122436 A1 | 5/2008 | Pinkos et al. |
| 2010/0255947 A1 * | 10/2010 | Povirk et al. .................. 475/150 |

* cited by examiner

DIFFERENTIAL ASSEMBLY AND DRIVING ASSEMBLY WITH A DIFFERENTIAL ASSEMBLY

CROSS REFERENCE TO RELATED APPLICATIONS

This application is a National Phase of International Application No. PCT/EP2010/068415, filed on Nov. 29, 2010, which claims priority to German Application No. 10 2009 056 088.2, filed on Nov. 30, 2009, which applications are hereby incorporated by reference in their entirety.

TECHNICAL FIELD

The present disclosure relates to a differential assembly, more particularly for being used in the driveline of a motor vehicle. Differential assemblies serve to transmit torque from a driving motor to the two sideshafts of a driving axle. Furthermore, the present disclosure relates to a driving assembly with an electric drive and such a differential assembly which can be driven by the electric drive.

BACKGROUND

From U.S. Pat. No. 6,027,422 there is known a switchable synchronising device for a four-wheel drive vehicle. The synchronising device can be switched in such a way that it is suitable for a two-wheel drive and a four-wheel drive. For this purpose, there is provided a differential assembly with a switchable claw coupling which, in a closed condition, transmits torque to the differential and, in an open condition, interrupts a torque flow.

From DE 102 16 290 A1 there is known a similar differential mechanism which is suitable for changing from two-wheel drive to four-wheel drive. The differential mechanism comprises a differential drive, a coupling and an electromagnetic actuator for actuating the coupling.

Document DE 101 51 713 A1 proposes a differential system for a hybrid vehicle. The hybrid vehicle comprises a front wheel drive system with an internal combustion engine and a rear wheel drive system with an electric motor. Via a reduction gear, the electric motor drives an axle differential which transmits the torque to the lefthand and righthand sideshafts. There is provided a control system with a sensor for recording the driving condition and for generating a motor signal for the electric motor. Under normal driving conditions, the internal combustion engine drives the front wheels. If necessary, for example when starting or accelerating the vehicle or when the front wheels slip, the rear wheels are additionally driven by the electric motor.

From DE 10 2004 039 826 B4 there is known a clutch unit, wherein an engagement of a dog clutch can be restricted until a revolution of an input shaft and the revolution of an output shaft correspond to each other so as to be suitable for the engagement. Thus, torque can be reliably transmitted from the driving source to the wheels through a reduction mechanism.

From US 2008/0122436 A1 there is known an electromagnetic actuator assembly and a differential assembly that incorporates same. The electromagnetic actuator assembly comprises a frame, a movable plunger, first and second sensor targets that are coupled to a plunger for movements therewith, first and second sensors that are coupled to the frame and controller. The first and second sensors are configured to sense a position of the first, respectively the second sensor target and to produce a first and second sensor signal in response thereto.

Electric motors have a limited speed range and are therefore usually used as supplementary drives in a motor vehicle which, in addition to the electric motor, comprises an internal combustion engine as the main drive. Therefore, the electric motor is primarily used for low vehicle speeds for driving the vehicle, for instance in urban traffic where frequent starting and braking operations are required. Because of the relatively high torque values provided by the electric motor, there exist good traction conditions and a good starting behaviour. At higher vehicle speeds, for example during long distance driving, the electric motor is switched off, so that the drag moment of the electric motor does not adversely affect the efficiency of the motor vehicle and fuel consumption. For switching off the electric motor, use is made of a controllable coupling which is arranged in the driveline between the electric motor and the differential drive.

There is a need for a differential assembly, more particularly for a driving axle driven by an electric motor in the driveline of a motor vehicle, which differential assembly reliably identifies the switching condition of the coupling and which comprises a simple and space-saving design.

SUMMARY

A differential assembly is disclosed herein, more particularly for a motor vehicle driving axle drivable by an electric motor, comprising a driving gear; a differential drive, a coupling effectively arranged between the driving gear and the differential drive, a controllable actuator for actuating the coupling and a sensor for determining at least three switching positions of the coupling. The differential drive includes an input part and two output parts, wherein the output parts are drivingly connected to the input part and, relative to one another, have a differential effect. In a closed condition of the coupling, torque is transmitted from the driving gear to the differential drive and, in an open condition of the coupling, a transmission of torque is interrupted.

"At least three switched positions" in this context means that the sensor, in addition to a first switched position in which the coupling is completely open and a second switched position in which the coupling is completely closed, is able to identify at least one, and in some exemplary arrangements, two or more intermediate positions between the first and the second switched position. The more intermediate positions the sensor is able to record, the more accurate the position identification of the coupling. The determination of the switched positions of the coupling in accordance with an exemplary arrangement of the disclosure should also include the determination of the switched positions of a further component whose position is representative of the switched position of the coupling. The input part of the differential drive can be a differential carrier for example, which can also be referred to as differential cage. If a bevel gear differential or a crown gear differential is used, the output parts of the differential drive can be sideshaft gears. If a planetary gear differential is used, the output parts can also be hollow gears and/or sun gears.

An exemplary advantage of the disclosed differential assembly is that the sensor is able to record at least one intermediate position which can then be used as the input value for controlling the electric motor. There is thus achieved a higher controlling accuracy and a reduced error-proneness. It is particularly advantageous if the sensor is able to determine incremental stages, i.e. continuously, the position of the coupling or of a component representing the position of the coupling. It is thus possible for the sensor to be able accurately to record the switched position of the coupling, at least over a partial range of the switching movement of the coupling. In this way, it is possible to record the position particularly accurately, so that the electric motor can be controlled more rapidly and more accurately on the basis of the sensor signal as an input signal. According to one exemplary arrangement, the coupling and the actuator are arranged coaxially relative to the axis of rotation of the differential drive. This results in a compact design of the entire unit.

The coupling may be provided in the form of a form-locking coupling, more particularly in the form of a toothed coupling or a claw coupling. It is understood that other types of coupling arrangements are also conceivable, which are able to initiate or interrupt a transmission of torque, for example a friction coupling.

According to another exemplary arrangement, the coupling comprises a first coupling part which is connected to a differential carrier of the differential drive, as well as a second coupling part which is held so as to be rotationally fixed and axially movable relative to a differential housing. For a simple production and assembly procedure it is particularly advantageous if the differential carrier and the second coupling part are produced in one piece. The second coupling part can be provided on an end face of the differential carrier in the form of teeth or claws or the like. The second coupling part may be, at least partially, arranged inside the differential housing, and the actuator may be located outside the differential housing, more particularly so as to axially adjoin the second coupling part. So that the coupling positioned inside the differential housing can be actuated by the actuator arranged outside the differential housing, the differential housing is may be provided with axial apertures through which axial projections of the first coupling part pass through. Furthermore, according to one exemplary embodiment, the differential housing comprises a sleeve projection on which the actuator is arranged. The actuator can be axially supported via a rolling contact bearing, which serves for supporting the rotating differential housing in a fixed housing.

According to another exemplary embodiment, the actuator is an electromagnetic actuator which comprises an electromagnet and a piston. The piston may be designed in such a way that, when the electromagnet is supplied with current, it is axially loaded towards the coupling and that, in a current-free condition, it moves away from the coupling and towards the electromagnet, respectively. In one exemplary arrangement, the piston comprises a piston in the form of an anchor element which, more particularly, comprises a ferro-magnetic material, as well as a sleeve which is firmly connected to the anchor element and which, in one exemplary arrangement, comprises a paramagnetic, respectively non-magnetic material. An electromagnetic actuator has certain advantages space-wise because it can be arranged closely to the differential gearbox and does not require any additional components. It is understood, however, that instead of an electromagnetic actuator, it is also possible to use a hydraulic or pneumatic actuator.

According to another exemplary embodiment of the disclosure, there is provided a sliding mechanism between the piston and the second coupling part. In one exemplary arrangement, the in form of a sliding bush. The sliding mechanism serves to decouple the rotational movement of the rotating second coupling part relative to the stationary piston, so that wear is reduced. In one exemplary arrangement, the sliding mechanism is paramagnetic, respectively non-magnetic. The sliding mechanism has two functions. The first function is to increase the distance between the electromagnet and the coupling, as a result of which magnetic leakage is reduced and the actuating force is increased. The second function is to reduce the friction value between the rotating parts and the non-rotating part, i. e. the piston. Thus, the piston and the anchor are prevented from co-rotating with the rotating parts, so that wear is reduced. The sliding mechanism may comprise a separate element, which is arranged somewhere in the path between the piston and the second coupling part. However, the sliding mechanism may also be in the form of a friction-reducing coating, which coating is provided on at least one of the parts which are arranged in the path between the piston and the second coupling part, i. e. on the piston and/or any intermediate part and/or the second coupling part.

According to another exemplary arrangement, the sliding mechanism is designed in form of a sliding bush, which at least indirectly, is axially supported on the second coupling part. Due to the sliding mechanism, a surface pairing between the sliding mechanism and the second coupling part or a component connected thereto, respectively a surface pairing between the sliding mechanism and the piston or a component connected thereto, feature a lower friction coefficient. A lower friction coefficient, more particularly is meant to be a friction coefficient which is smaller than that of a steel/steel combination. The sliding mechanism may be made of bronze or contain bronze, for example, but can also be of any other suitable anti-friction material.

According to another exemplary arrangement, there is provided a transmitter element which cooperates with the sensor and is designed in such a way that it is axially moved when the actuator is actuated. According to a first possibility, the transmitter element is at least indirectly firmly connected to the second coupling part, with the transmitter element axially moving jointly with the second coupling part when the actuator is in operation. The transmitter element may be provided in the form of an annular disc which is firmly connected to the second coupling part and jointly rotates therewith around the axis of rotation. More particularly, the annular disc projects radially outwardly from the second coupling part. For the purpose of being fixed to the second coupling part, in one exemplary arrangement, the annular disc comprises a plurality of engaging elements which form-lockingly engage corresponding recesses in the second coupling part. Instead of providing a form-locking connection, it is also possible to use other fixing means, such a force-locking connection, for example by means of bolts, or a material-locking connection in the form of a welded connection. According to a second possibility, the transmitter element is at least indirectly connected to the piston, with the transmitter element, more particularly, projecting radially outwardly from the piston. This embodiment is advantageous in that the transmitter element does not co-rotate together with the second coupling part, but merely follows the axial movements of the piston, so that performance losses are kept to a minimum. For connecting the transmitter element to the piston, all the above-mentioned possibilities are suitable.

According to another exemplary embodiment, there is provided a returning spring which, at least indirectly, is arranged between the second coupling part and the housing, with the returning spring loading the second coupling part in an opening sense. "At least indirectly" in this sense means that the returning spring can be directly supported on the differential housing and the second coupling part respectively or indirectly via a further component, for example an annular disc. The returning spring may be positioned with pretension between the housing and the annular disc and, more particularly, is provided in the form of a plate spring, with other springs, for example one or more helical springs, also being suitable.

According to another exemplary embodiment, the sensor determines a signal which represents the path of the transmitter element, i.e. the sensor is provided in the form of a path sensor. In one exemplary arrangement, the sensor is a contact-free sensor, such as, for example, a magnetic field sensor which can also be referred to a Hall sensor, or an induction sensor. Using a contact-free sensor is advantageous of achieving low performance losses and a low degree of wear. Furthermore, the sensor can be installed from the outside in the fixed housing in which the differential assembly is supported. The sensor may extend through a centring bore and a thread so as to be positioned parallel to, but offset relative to, the centering bore and can therefore easily be replaced. Sealing is affected by an O-ring which is effectively inserted between the sensor and the stationary housing. The Hall sensor or induction sensor records the distance from the transmitter element, respectively the annular disc, and transmits a corresponding sensor signal to an electronic control unit.

According to another exemplary embodiment, the sensor is arranged so as to adjoin the electromagnet, more particularly so as to extend axially in the region of the electromagnet and so as to radially adjoin the electromagnet. In this connection, "axially in the region of the electromagnet" means that, in a side view, the sensor is arranged so as to at least partially axially overlap with the electromagnet. More particularly, it is proposed that the sensor comprises a main direction of extension, with the sensor, according to a first possibility, being arranged in such a way that the main direction of extension extends parallel to the axis of rotation of the differential drive. In such a case, the sensor determines the distance from the transmitter element. According to a second possibility, the sensor can also be arranged in the radial direction relative to the axis of rotation of the differential drive, in which case the sensor determines the axial overlap with the respective transmitter element. If a Hall sensor is used, the transmitter element comprises a ferromagnetic material. If an induction sensor is used, the transmitter element is made of a paramagnetic, respectively non-magnetic material.

More particularly when the sensor is provided in the form of a Hall sensor and is arranged so as to adjoin the electromagnet, it is advantageous if the actuation current for actuating the electromagnet is taken into account when recording the position of the transmitter element. According to one exemplary embodiment, there is provided an electronic control unit which controls the electric motor, with a sensor signal being transmitted from the sensor to the electronic control unit. For determining the position of the coupling particularly accurately when evaluating the sensor signal, a current signal representing the coil current of the electromagnet is taken into account. More particularly, the characteristic curve of the sensor is linearly dependent on the actuation current.

A further aspect of the disclosure comprises providing a method of controlling the actuator in a differential assembly, with the actuator being controlled depending on or as a function of the switching position of the coupling, more particularly at switching positions between a completely open position and a completely closed position. For instance, the closing force of the actuator required for closing the coupling can already have been reduced before the coupling is in its closed position in which the coupling parts fully engage one another. In this way, the energy requirements of the actuator, e.g. the current requirements when using an electro-magnetic actuator, can be adapted to the switching position of the coupling, even in intermediate regions between the fully open and the fully closed position.

Furthermore, a driving assembly for driving a driving axle of a motor vehicle is disclosed. The driving assembly has an electric motor and a differential assembly which can be driven by the electric motor, wherein the differential assembly is designed in accordance with one of the above-mentioned embodiments.

By using the disclosed driving assembly, it is possible to ensure the above-mentioned advantages of accurately and reliably recording the position of the coupling, more particularly of the second coupling part, respectively of the piston. This, in turn, results in accurately and rapidly controlling the electric motor and this reliably and rapidly controlling the driving moment to the associated driving axle of the motor vehicle. It is thus possible, quickly, to respond to the respective driving conditions by controlling the electric motor, for example when engaging the ABS or ESP system.

A further aspect of the disclosure includes providing a method of controlling the electric motor of said driving assembly, with the electric motor being controlled as a function of the switched position of the coupling, more particularly also in any intermediate position between a completely open position and a completely closed position. For example, the electric motor can already be switched on for driving the driving axle before the coupling has reached its final closed position in which the coupling parts engage one another fully. In this way, the electric motor is reliably controlled as a function of the accurate switched position of the coupling, especially also in intermediate ranges between the fully open and fully closed position.

In one exemplary arrangement, the electric motor is controlled as a function of the amperage required for controlling the electromagnet, preferably also as a function of an ambient temperature. According to a first possibility, it is possible to program a learning function into the control unit, which learning function records the sensor signal in the engaged and disengaged condition as a function of the amperage and the ambient temperature. On the basis of this learning function, it is possible, with certain existing sensor signals, to assess more accurately whether the coupling is engaged or disengaged. According to a second possibility of controlling the electric motor, it is possible, as a function of the amperage and of the ambient temperature, to record the sensor signal in the form of characteristic curves and program same into the control unit, which can also be referred to as "mapping". This permits an accurate detection of the actuator position and of the coupling position as a function of amperage, temperature and hysteresis.

BRIEF DESCRIPTION OF THE DRAWINGS

Exemplary embodiments will be explained below with reference to the drawings wherein.

DETAILED DESCRIPTION

Figure 1:
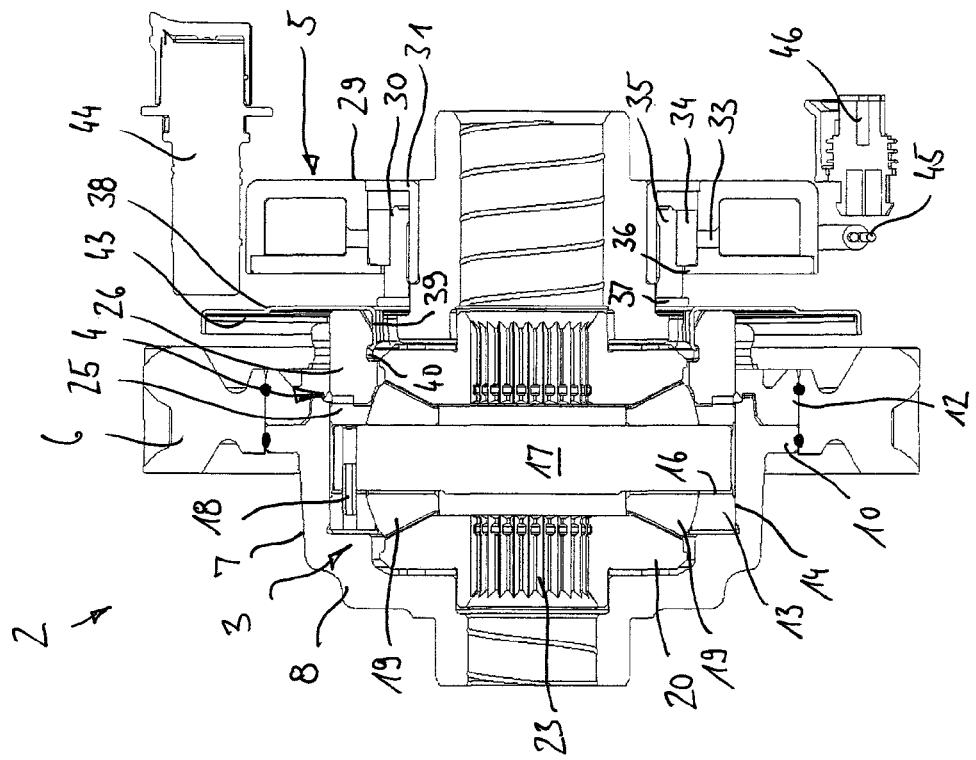
FIG. 1 is a longitudinal section of an inventive differential assembly with a coupling in a first embodiment in an open position of the coupling.

FIGS. 1 to 4 show an inventive differential assembly 3 in a first embodiment and will be described jointly below. There is shown a differential assembly 2 which comprises a differential drive 3, a coupling 4 and an actuator 5 for actuating the coupling 4. For introducing a torque from a driving motor (not shown), there is provided a driving gear 6 which is firmly connected to the differential housing 7, more particularly by welding. It is understood, however, that the connection between the driving gear 6 and the differential housing 7 can also be effected in a different way, for example by a bolted connection or other conventional connecting arrangements. The differential housing 7 is constructed in two parts and comprises a first cup-shaped housing part 8 and a second cup-shaped housing part 9 which, in the region of their aperture ends, each comprise a flange portion 10, 12 by which they are connected to the driving gear 6. The first housing part 8 contains the differential drive 3 which is rotatingly drivable around an axis of rotation A.

The differential drive 3 comprises a differential carrier 13 which comprises a substantially cylindrical outer face 14 by which the differential carrier 13 is slidingly supported relative to the respective inner cylindrical face portion 15 of the first housing part 8 so as to be rotatable around the axis of rotation A. In the differential carrier 13 there are provided two bores 16 into which a journal 17 is inserted and fixed by a securing pin 18. Two differential gears 19 are supported on the journal 17 so as to be rotatable around the journal axis B. The two differential gears 19 engage the teeth of a first and of a second sideshaft gears 20, 22 which are arranged coaxially relative to the axis of rotation A. The two sideshaft gears 20, 22 each comprise longitudinal teeth 23, respectively splines, which can be inserted into corresponding counter teeth of a sideshaft (not shown). The first sideshaft gear 20 is axially supported relative to the first housing part 8, and in one exemplary arrangement, a sliding disc is arranged between the first sideshaft gear 20 and the supporting face of the first housing part 8. Accordingly, for supporting the axial forces, a sliding disc is also arranged between the second sideshaft gear 22 and the second housing part 9.

In the present embodiment, the coupling 4 is provided in the form of a form-locking coupling, more particularly a toothed coupling or dog clutch. It is understood that other types of couplings can also be used, for instance a friction coupling. The form-locking coupling 4 comprises a first coupling part 25 which is firmly connected to the differential carrier 13, as well as a second coupling part 26 which is axially movable relative to the first coupling part 25. For torque transmitting purposes, the second coupling part 26 can be engaged with the first coupling part 25, and there is then achieved a form-locking connection between the two coupling parts 25, 26. By once again disengaging the second coupling part 26, the transmission of torque can be interrupted. The first coupling part 25 comprises a toothed ring as the form-locking element which is integrally formed on to the end face of the differential carrier 13. Accordingly, the second coupling part 26 comprises a corresponding toothed ring which is arranged inside the differential housing 7. Furthermore, the second coupling part 26 comprises a plurality of circumferentially distributed axial projections 27 which pass through corresponding passages 28 of the differential housing 7. By suitably controlling the actuator 5, the second coupling part 26 can be axially moved relative to the first coupling part 25, whereby a transmission of torque is ensured from the driving gear 6 to the differential drive 3 in an engaged condition, whereas the transmission of torque is interrupted in a disengaged condition.

The actuator 5 comprises an electromagnet 29 and a piston 30. The actuator 5 is designed in such a way that, when supplying the electromagnet 29 with current, the piston 30 is loaded towards the coupling 4. For this purpose, the electromagnet 29 comprises an annular housing 32 which comprises an aperture 33 at a radially inner end facing the coupling 4. The piston 30 is arranged so as to be axially movable inside said housing portion. The housing 32 is arranged on a sleeve portion of the second housing part 9 by means of a carrier element 31. The piston 30 comprises an anchor element 34 that may be made of a ferromagnetic material, for instance an iron material, as well as a sleeve 35 comprising a paramagnetic material, respectively non-magnetic material, for example stainless steel, copper or aluminium. The anchor element 34 is sleeve-shaped and pressed on to the sleeve 35.

Because the anchor element 34 is produced from a ferromagnetic material, it is moved towards the coupling 4 when the electromagnet 29 is operated, with the gap 33 being bridged. In its end position, the anchor element 34 abuts a shoulder 36 of the magnet housing 32 and there occurs a friction contact. The sleeve 35 is paramagnetic, respectively non-magnetic, in order to prevent undesirable magnet flow leakage to other components.

The sleeve 35 is axially longer than the anchor element 34 and comprises an end face which is in contact with a sliding mechanism 37. The sliding mechanism 37 may be in the form of a sliding bush, which can also be referred to as sliding ring 37. The sliding mechanism 37 is made of a low-friction material, such as bronze, sinter metal or any other suitable low friction material. Thus, the sliding mechanism 37 is suitable to decouple the rotational movement of the rotating second coupling part 26 relative to the stationary piston 30. The sliding ring 37 is indirectly axially supported relative to the second coupling part 26 via a transmitter element 38. As a matter of course, the sliding mechanism can also be in form of an anti-friction coating which is provided on at least one of parts which is rotating relative to another part, i. e. one part out of the group sleeve 35, any intermediate part between the sleeve 35 and the second coupling part 26, such as the transmitter element 38, and the second coupling part 26. The sliding mechanism 37 can also be formed integral with the sleeve 35, so as to form an integral sliding sleeve made of a low friction material. The sliding mechanism 37 can also be formed integral with the transmitter element 38, so as to form an integral sliding transmitter element made of a low friction material.

In the present exemplary embodiment, the transmitter element 38 is provided in the form of an annular disc which, on its radial inside, comprises a plurality of circumferentially distributed, axially extending resilient engagement elements 39 which, by means of their ends, form-lockingly engage one or several undercuts 40 of the second coupling part 26. At its radially outer end, the annular disc comprises a cylindrical portion 42. Between the differential housing 7, respectively the second housing part 9, and the transmitter element 38, there is arranged a returning spring 43. In the present embodiment, the returning spring 43 is provided in the form of a plate spring, and it is understood that it is also possible to use other types of spring, such as helical springs.

Figure 2:
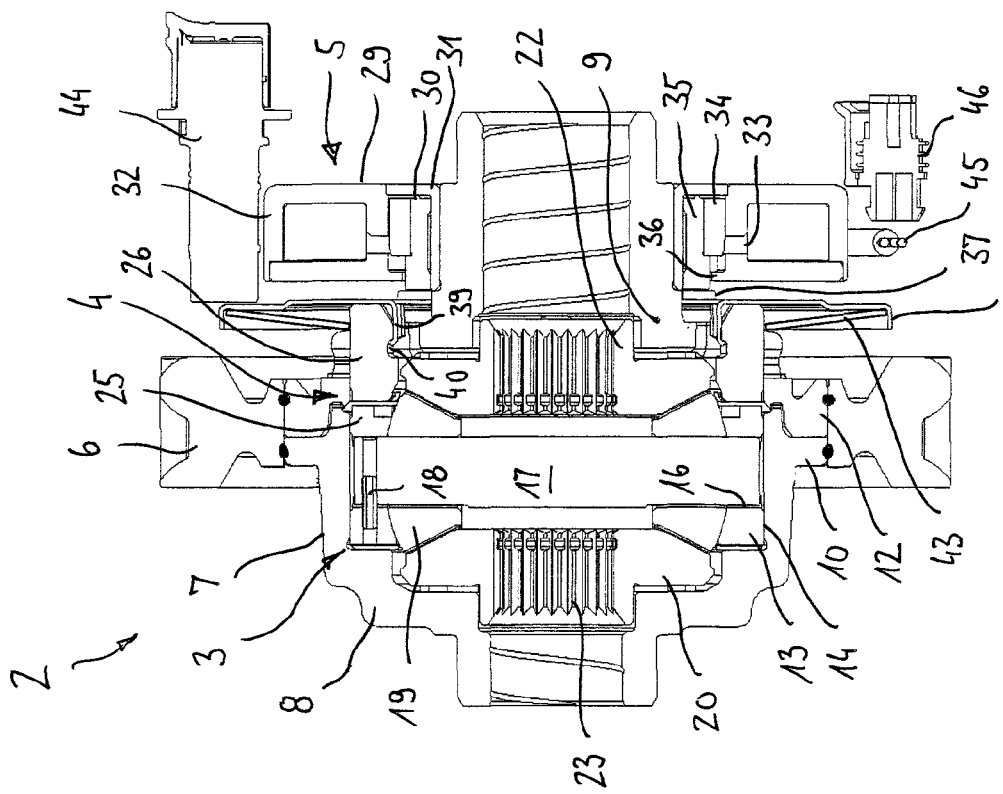
FIG. 2 shows the differential assembly according to FIG. 1 in a closed position of the coupling.

Furthermore, a sensor 44 is provided which is arranged axially in the region of the actuator 5 and which cooperates with the transmitter element 38. In the present embodiment, the sensor 44 is provided in the form of a Hall sensor which is able to record the distance from the transmitter element 38 in a contact-free way. It is also possible to use another type of contact-free sensor such as an induction sensor. The sensor 44 is received in a stationary housing 41 partially shown in FIG. 4 and it is arranged in such a way that a main direction of extension of the sensor 44 extends parallel to the axis of rotation A of the differential drive 3. In the open position of the coupling 4, i.e. in the position in which the transmitter element 38 axially approaches the sensor 44, there is provided a gap between the transmitter element 38 and the sensor 44. This position in which the coupling 44 is open is shown in FIG. 1. FIG. 2, on the other hand, shows a switched position in which, for the purpose of transmitting torque from the driving gear 6 to the differential carrier 13, the coupling 4 is the engaged position. It can be seen that the transmitter element 38 together with the second coupling part 26 has been moved relative to the sensor 44 towards the first coupling part 25 and the differential drive 3, respectively.

Figure 3:
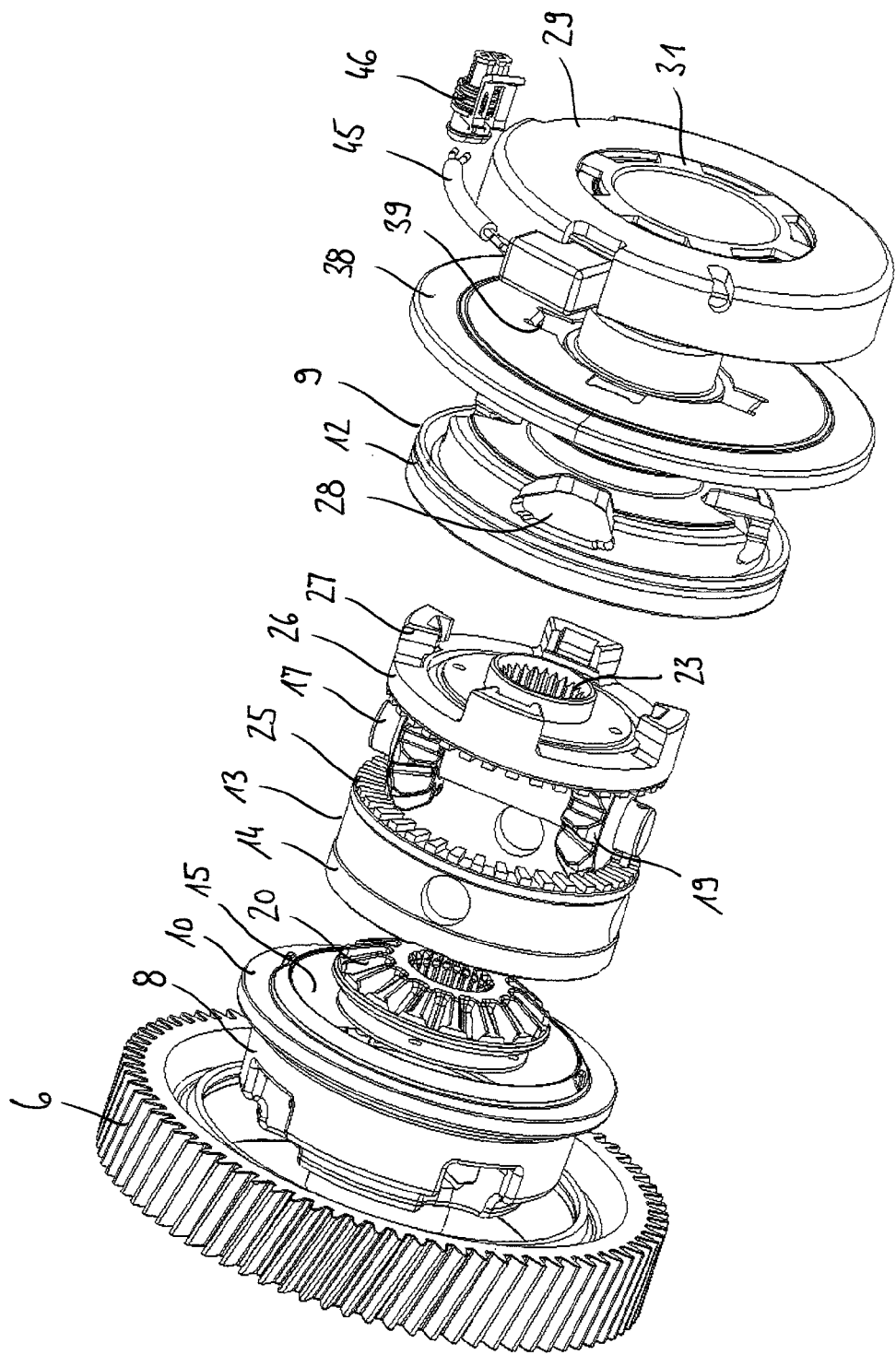
FIG. 3 is an exploded perspective view of the differential assembly according to FIG. 1.
Figure 4:
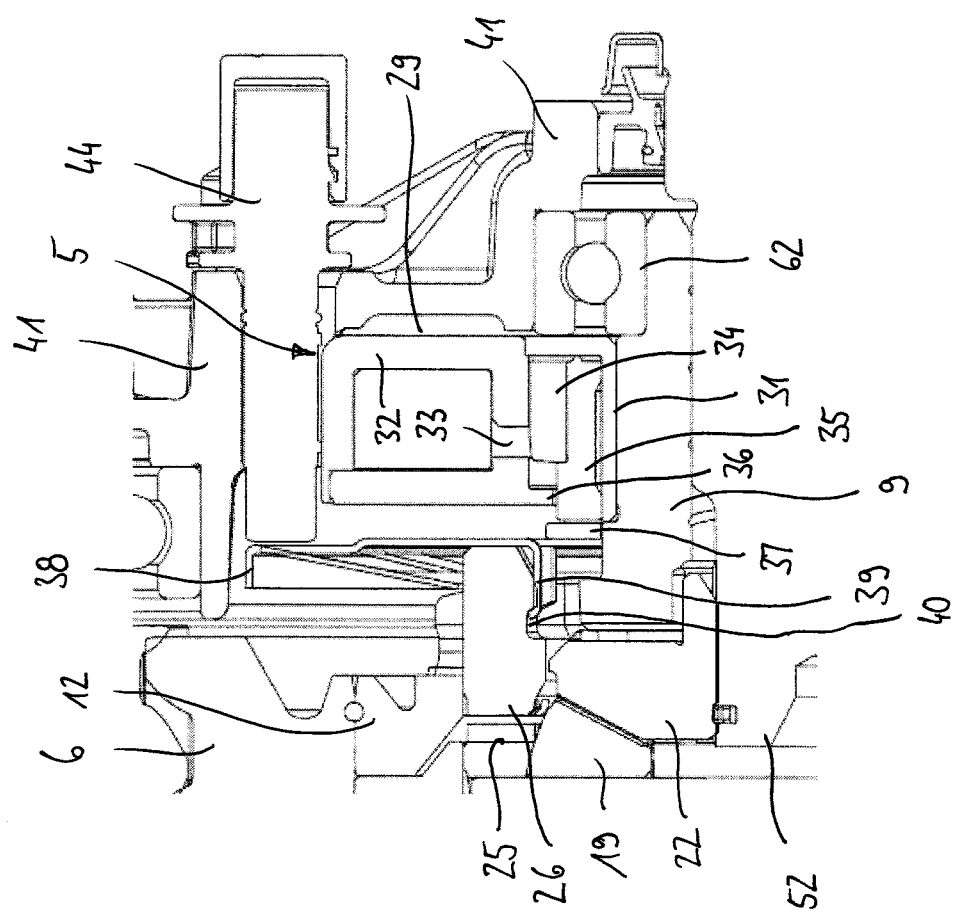
FIG. 4 is a longitudinal section of a detail of the differential assembly according to FIG. 1.

FIGS. 1, 2 and 3 also show connecting cables 45 as well as a cable duct 46 for conducting the cable 45 through the fixed housing 41. FIG. 4 partially shows the stationary housing 41 in the form of a detail in which the sensor 44 is located. For this purpose, the housing 41 comprises an aperture into which the sensor 44 can be inserted in a direction extending axis-parallel relative to the axis of rotation A. A sealing ring (not illustrated) is provided for sealing the housing 41 relative to the sensor 44.

Figure 5:
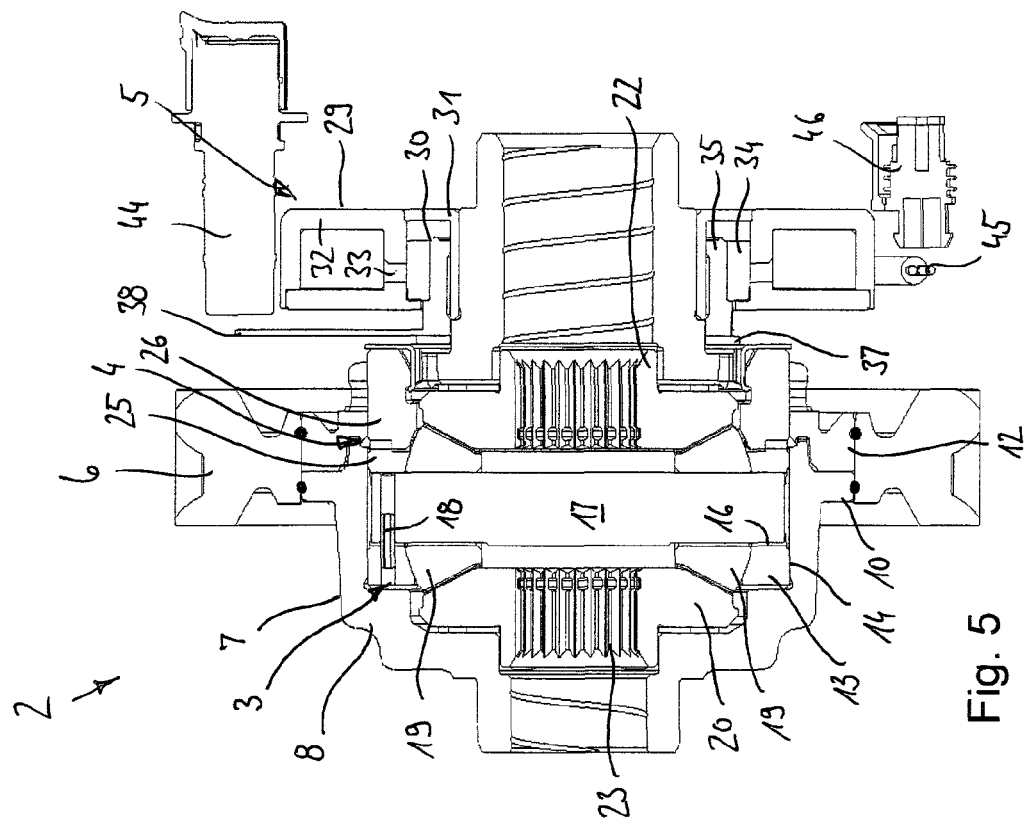
FIG. 5 is a longitudinal section of an inventive differential assembly in a second embodiment.

FIG. 5 shows an inventive differential assembly 2 in a second embodiment which largely corresponds to the embodiments according to FIGS. 1 to 4, so that, in respect of their common features, reference is made to the above description. Identical or modified components have been given the same reference numbers as in FIGS. 1 to 4, with any differences being described below.

The special characteristic of the present embodiment is that the transmitter element 38 is firmly connected to the piston 30, more particularly to the sleeve 35 of the piston 30. The transmitter element 38 is fixed to an axial end of the sleeve 35, with any type of fixing being acceptable, for example a form-locking, force-locking or material-locking connection. The transmitter element 38 projects radially outwardly from the sleeve 35 and ends in a region of the sensor 44. As already described in the embodiments according to FIGS. 1 to 4, the transmitter element 38 is comprised of a ferromagnetic material. An advantage of the present embodiment is that the transmitter element 38 is fixed to the piston 30 and thus does not carry out a rotary movement, but only translatory movements. As a result, the transmitter element 38, in the circumferential direction, only needs to extend approximately in the partial region of the sensor 44, so that it is more lightweight overall. Furthermore, performance losses in the present invention are very small.

Figure 6:
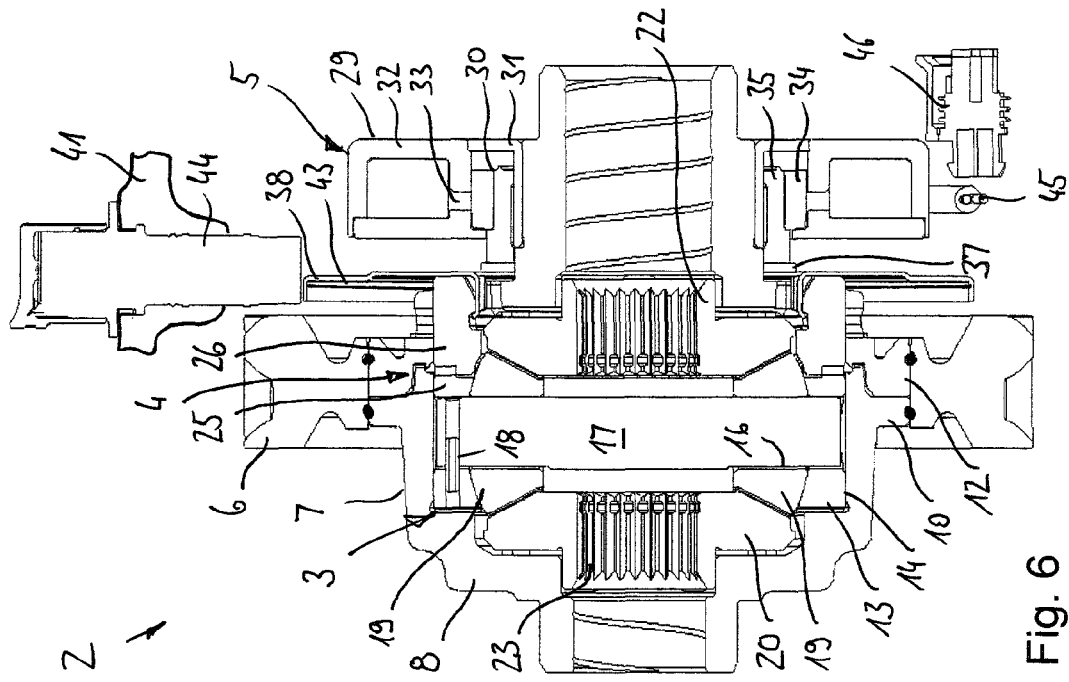
FIG. 6 is a longitudinal section of an inventive differential assembly in a third embodiment.

FIG. 6 shows an inventive differential assembly 2 in a third embodiment which largely corresponds to the embodiments according to FIGS. 1 to 4, so that, in respect of their common features, reference is made to the above description. Identical or modified components have been given the same reference numbers as in FIG. 1 to 4, with any differences being described below.

The special characteristic of the present embodiment is that the main direction of extension of the sensor 44 extends radially relative to the axis of rotation A of the differential drive 3. Under certain spatial conditions, this can be advantageous. In the present embodiment, the sensor 44 generates a sensor signal which depends on the axial overlap of the outer, in particular cylindrical portion of the transmitter element 38 with the sensor 44. As in the above embodiment, the sensor 44 is received in the fixed housing 41.

Figure 7:
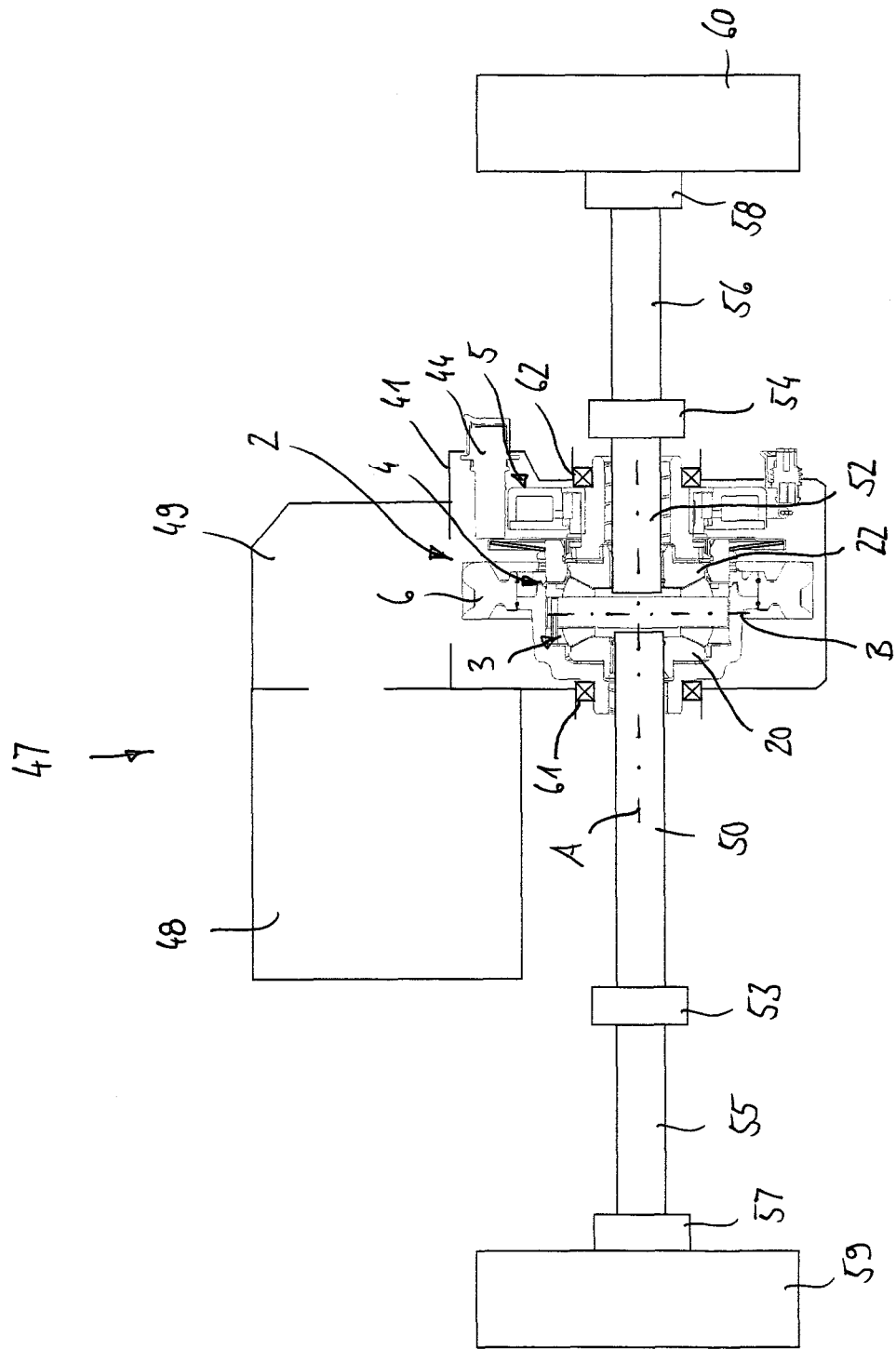
FIG. 7 is a diagrammatic view of an inventive driving assembly with an inventive differential assembly according to FIG. 1.

FIG. 7 shows an inventive driving assembly 47 with an inventive differential assembly 2 according to FIGS. 1 to 4 in a diagrammatic view. The gearbox assembly 47 comprises an electric motor 48 which, via a transmission stage 49, drives the differential assembly 2, i.e. the driving gear 6 of the differential assembly 2. When the coupling 4 is closed, torque is transmitted from the differential drive 3 to the two sideshaft gears 20, 22. For torque transmitting purposes, sideshafts 50, 52 are connected in a rotationally fixed way to the sideshaft gears 20, 22, by longitudinal teeth 23, respectively splined connections. At the ends of the sideshafts 50, 52, there are arranged constant velocity universal joints 53, 54 which, in turn, via driveshafts 55, 56 and constant velocity joints 57, 58, are connected to wheels 59, 60 of the motor vehicle for transmitting torque thereto. It can be seen that the differential assembly 2 is supported by bearings 61, 62 relative to the stationary housing 41 so as to be rotatable relative to the axis of rotation A.

Figure 8:
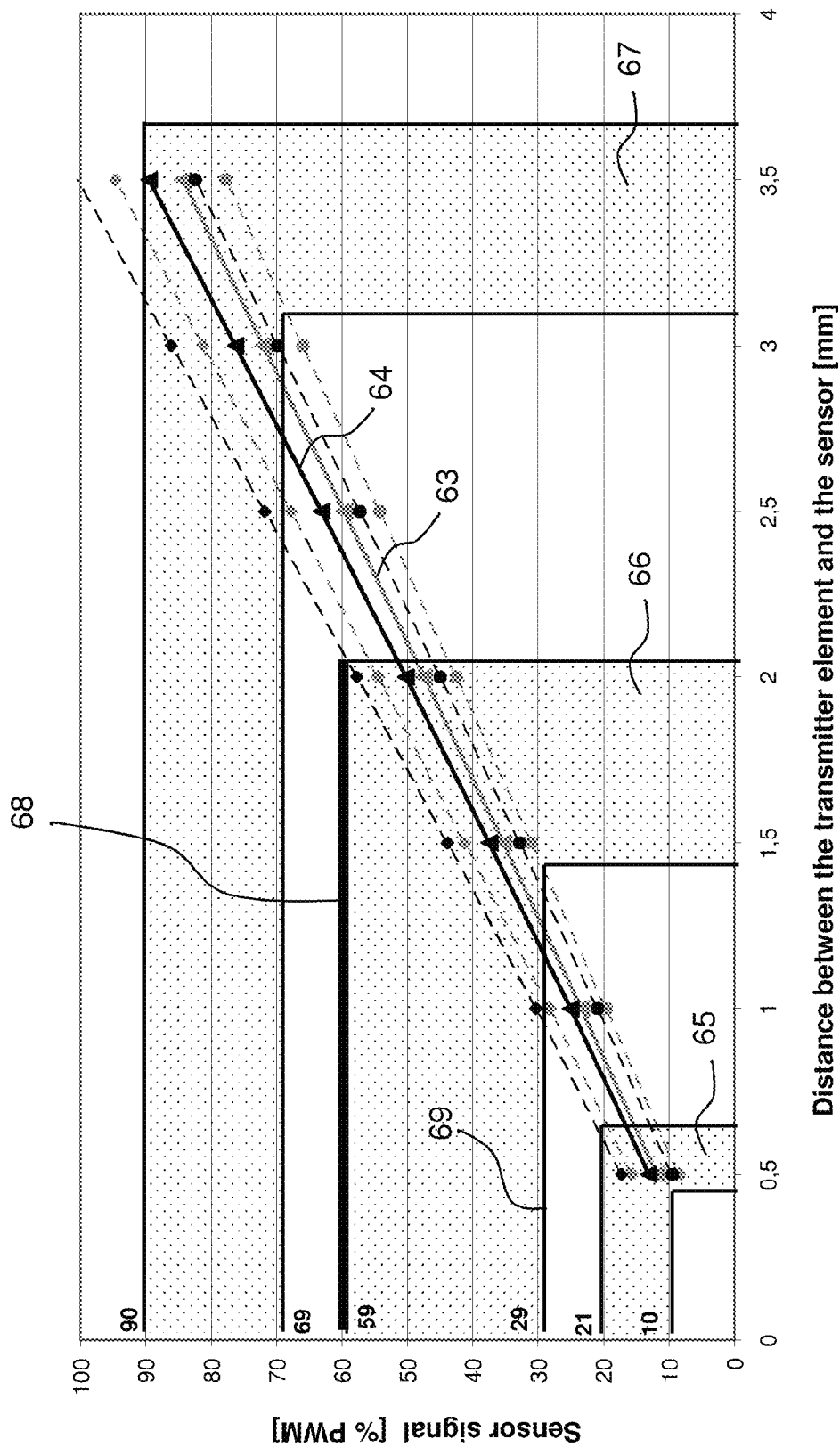
FIG. 8 shows characteristic curves explaining the connection between sensor signals and a distance between a transmitter element and a sensor as a function of amperage used for controlling an electromagnet.

FIG. 8 shows a diagram which explains the connection between the sensor signals as a function of the distance between the transmitter element 38 and the sensor 44 as a function of the different amperage values for controlling the electromagnet 29. On the Y-axis there is given the sensor signal as a percentage of the pulse width modulation (PWM). On the X-axis there is entered the distance from the transmitter element 38 and the sensor 44 in millimeters. The continuous lines 63, 64 indicate the amperage with which the electromagnet 29 is supplied, with the lower flatter line 63 indicating the course of an amperage of 2.3 A, whereas the upper line 64 indicates the course for an amperage of 3.0 A. The dashed lines mark the upper and lower tolerance limits for the first and the second continuous line 63, 64.

The three grey areas 65, 66 and 67 represent different switched conditions of the coupling 4. The lower area 65 which is characterised by a distance between the transmitter element 38 and the sensor 44 of approximately 0.45 mm and 0.65 mm and by a sensor signal of approximately 10 PWM to 21 PWM, indicates the characteristic range within which the coupling 4 is securely switched off, i.e. within which the second coupling part 26 is clearly disengaged from the first coupling part 25. The central area 66 which is defined by a distance between the transmitter element 38 and the sensor 44 of approximately 1.43 mm to 2.05 mm and by a sensor signal of 29 PWM to 59 PWM represents an intermediate position wherein the coupling 4 is partly closed, i.e. the teeth of the second coupling part 26 already partially engage the teeth of the first coupling part 25. The third area 67 which is characterised by a distance between the transmitter element 38 and the sensor 44 of approximately 3.1 mm and 3.7 mm and by a sensor signal of approximately 69 PWM to 90 PWM indicates the characteristic range within which the coupling 4 is securely switched on, i.e. within which the first coupling part 25 and the second coupling part 26 are fully engaged. In this position, the anchor element 34 is in surface contact with the collar 36, with the friction forces existing between the two elements in the case of surface contact preventing the anchor element 34 and the piston 30 from rotating. In this way, too, wear is kept to a minimum. In this fully engaged position, the amperage of the electromagnet 29 can be kept to a low holding current, which has an advantageous effect on energy consumption.

The upper end of the central area 66 marks the first limit line 68 for the engagement of the coupling 4. Above said first limit line 68 the coupling 4 has been engaged to such an extent that torque can be transmitted, i.e. the electric motor 48 is able to introduce torque into the differential assembly 2 before the coupling 4 is fully closed. This embodiment thus permits an accurate and improved control of the electric motor 48. A second limit line 69 marks the lower end of the central area 66 for the engagement of the coupling 4, i.e. below said second limit line 69, the coupling 4 is disengaged to such an extent that it can no longer transmit torque. The central area formed between the upper first limit line 68 and the lower second limit line 69 indicates the switched position wherein the teeth of the first and the second coupling part 25, 26 meet one another. In this area, the teeth do not yet engage one another. If the distance between the transmitter element 38 and the sensor 44 is within this central area 66, which is defined by the limit lines 68, 69, torque must not yet be introduced by the electric motor 48 into the differential assembly 2 because a secure transmission of torque between the two coupling parts 25, 26 is not yet ensured. Above the first limit line 68 (59% PWM) the teeth are engaged and the electric motor 48 can introduce torque into the differential assembly 2.

It can be seen in FIG. 8 that the distance between the transmitter element 38 and the sensor 44—with an identical sensor signal—depends on the amperage with which the electromagnet 29 is supplied. If, for example, the electromagnet 29 is supplied with 3.0 A and if a signal of 50 PWM is generated by the sensor 44, it is possible to derive therefrom a distance between the transmitter element 38 and the sensor 44 of 2.0 mm. If the same sensor signal of 50 PWM is determined at an amperage of 2.3 A, this means that the distance between the transmitter element 38 and the sensor 44 is greater and amounts to approximately 2.1. Therefore, to determine the distance between the transmitter element 38 and the sensor 44 as accurately as possible it is advantageous if, when undertaking the calculation, the amperage for controlling the electromagnet 29 is taken into account. In this way it is thus possible to obtain particularly reliable information regarding the closed position of the coupling 4.

The process of determining the distance between the transmitter element 38 and the sensor 44 takes place in a central control unit (not illustrated). The input data are at least the sensor signal of the sensor 44 and the amperage signal of the electromagnet 29 from which there is then calculated the distance between the sensor 44 and the transmitter element 38, from which value conclusions can be drawn regarding the depth of engagement of the second coupling part 26 in the first coupling part 25.

Overall, the inventive driving assembly 47 and the inventive differential assembly 2 are advantageous in that it becomes possible to accurately record the position of the coupling 4. There is thus reliably generated information regarding the condition of engagement of the coupling 4, i.e. if a form-locking coupling is used, it is possible to determine whether the overlap of the teeth is sufficient to transmit torque to the differential gearbox 3 and the driving axle. Furthermore, by accurately determining the switched position, any defects can be detected at an early stage and any malfunction can be avoided.

The invention claimed is:

1. A differential assembly, comprising:
   a driving gear;
   a differential drive with an input part and two output parts, wherein the output parts are drivingly connected to the input part and, relative to one another, have a differential effect;
   a coupling effectively arranged between the driving gear and the differential drive, wherein, in a closed condition of the coupling, torque is transmitted from the driving gear to the differential drive and, in an open condition of the coupling, a transmission of torque is interrupted;
   a controllable actuator for actuating the coupling, wherein the actuator comprises an electromagnet and an axially displaceable piston, and wherein the actuator is configured to generate a current signal representing a coil current of the electromagnet;
   a sensor for determining at least three switching positions of the coupling, wherein the sensor is configured to generate a sensor signal representing a switching position of the coupling; and
   an electronic control unit which is configured to receive said sensor signal from said sensor, to evaluate the sensor signal thereby taking into account the current signal of the electromagnet, to generate an evaluated sensor signal, and to control the electric motor based on said evaluated sensor signal.

2. A differential assembly according to claim 1, wherein a first coupling part of the coupling is connected to a differential carrier of the differential drive and that a second coupling part of the coupling is held relative to a differential housing of the differential drive in a rotationally fixed and axially movable way.

3. A differential assembly according to claim 2, wherein there is provided a returning spring which, at least indirectly, is arranged between the second coupling part and the differential housing, wherein the returning spring loads the second coupling part in the sense of opening the coupling.

4. A differential assembly according to claim 1, wherein the sensor is a contact-free sensor.

5. A differential assembly according to claim 1, wherein the piston is axially loaded towards the coupling when the electromagnet is supplied with electric current, and wherein the piston is arranged away from the coupling in a current-free condition of the electromagnet.

6. A differential assembly according to claim 5, wherein the sensor is arranged so as to adjoin the electromagnet.

7. A differential assembly according to claim 5, wherein the coupling includes first and second coupling parts, and wherein between the piston and the second coupling part, there is arranged a sliding mechanism for uncoupling the rotational movement of the second coupling part relative to the piston.

8. A differential assembly according to claim 7, wherein the sliding mechanism comprises a sliding bush which, at least indirectly, is axially supported on the second coupling part.

9. A differential assembly according to claim 7, wherein there are formed paired faces between the sliding mechanism and the second coupling part and/or between the sliding mechanism and the piston, wherein said paired faces comprise a low friction coefficient.

10. A differential assembly according to claim 1, wherein there is provided a transmitter element which cooperates with the sensor, wherein the transmitter element is designed such that the transmitter element is axially moved when the actuator is operated.

11. A differential assembly according to claim 10, wherein the coupling has a first coupling part and a second coupling part, and wherein the transmitter element, at least indirectly, is connected to the second coupling part wherein, when the actuator is operated, the transmitter element is axially moved together with the second coupling part.

12. A differential assembly according to claim 10, wherein the transmitter element, at least indirectly, is connected to the piston, wherein the transmitter element extends radially outwardly from the piston.

13. A differential assembly according to claim 10, wherein the sensor determines a signal which represents a path of the transmitter element.

14. A driving assembly for driving a driving axle of a motor vehicle, comprising an electric motor and a differential assembly which can be driven by the electric motor,
the differential assembly comprising:
a driving gear;
a differential drive with an input part and two output parts, wherein the output parts are drivingly connected to the input part and, relative to one another, have a differential effect;
a coupling effectively arranged between the driving gear and the differential drive, wherein, in a closed condition of the coupling, torque is transmitted from the driving gear to the differential drive and, in an open condition of the coupling, a transmission of torque is interrupted;
a controllable actuator for actuating the coupling,
wherein the actuator comprises an electromagnet and an axially displaceable piston,
wherein the actuator is configured to generate a current signal representing a coil current of the electromagnet,
a sensor for determining at least three switching positions of the coupling,
wherein the sensor is configured to generate a sensor signal representing a switching position of the coupling, and
an electronic control unit which is configured to receive said sensor signal from said sensor, to evaluate the sensor signal thereby taking into account the current signal of the electromagnet, to generate an evaluated sensor signal, and to control the electric motor based on said evaluated sensor signal.

15. A method of controlling an electric motor in a driving assembly for driving a driving axle of a motor vehicle,
the driving assembly comprising an electric motor and a differential assembly drivable by said electric motor,
said differential assembly comprising:
a driving gear;
a differential drive with an input part and two output parts, wherein the output parts are drivingly connected to the input part and, relative to one another, have a differential effect;
a coupling effectively arranged between the driving gear and the differential drive, wherein, in a closed condition of the coupling, torque is transmitted from the driving gear to the differential drive and, in an open condition of the coupling, a transmission of torque is interrupted;
a controllable actuator for actuating the coupling, and
a sensor for determining at least a fully open position, a partially engaged position and a fully closed position of the coupling, the method comprising that the electric motor is controlled depending on a switching position of the coupling at least at switching positions between the fully open position and the fully closed position.

16. A method according to claim 15, wherein the electric motor is controlled depending on the current for controlling the electromagnet.

17. A method according to claim 16, wherein the electric motor is controlled as a function of the ambient temperature.

* * * * *